United States Patent [19]

Bergeron

[11] Patent Number: 5,032,093

[45] Date of Patent: Jul. 16, 1991

[54] NOSE CONE WITH INTEGRAL SPEEDOMETER PICK-UP

[76] Inventor: Robert M. Bergeron, Whithers Grove, Derry, N.H. 03038

[21] Appl. No.: 441,064

[22] Filed: Nov. 22, 1989

[51] Int. Cl.$^5$ .................................................. B60L 1/14
[52] U.S. Cl. ...................................... 440/002; 73/182
[58] Field of Search .................. 440/1, 2, 88, 89, 78; 73/181, 182

[56] References Cited

U.S. PATENT DOCUMENTS

| | | | |
|---|---|---|---|
| T. 981,002 | 4/1979 | Snyder | 73/182 |
| 2,627,181 | 2/1953 | Kiekhaefer | 440/2 |
| 3,210,995 | 10/1965 | Kiekhaefer | 73/182 |
| 4,070,909 | 1/1978 | Carpenter | 73/182 |
| 4,275,603 | 6/1981 | Kalocsay | 73/182 |
| 4,832,635 | 5/1989 | McCormick | 440/88 |

*Primary Examiner*—Jesus D. Sotelo
*Attorney, Agent, or Firm*—Davis, Bujold & Streck

[57] ABSTRACT

A nose cone comprising a substantially conical lower portion, defining an axis, and a hydrodynamic portion extending substantially normal to the axis with a smooth transition between the exterior surfaces of the conical portion and the hydrodynamic portion. The conical portion tapers into a tip which houses a metal tubing having an opening lying substantially on the axis and the opposite end of the tubing extends normal to the axis out through an end of the hydrodynamic portion remote from the tip. The metal tubing preferably has a gradual transition to minimize any pressure losses which may occur and can be cast within the nose cone assembly upon manufacture thereof or can be assembled thereafter. The rear portion of the nose cone assembly is provided with a recessed area for attaching the nose cone to the forward portion of a propulsion device. Alternatively, the propulsion device could be manufactured with components which substantially incorporate the shape of the nose cone and have the metal tubing incorporated therein.

7 Claims, 2 Drawing Sheets

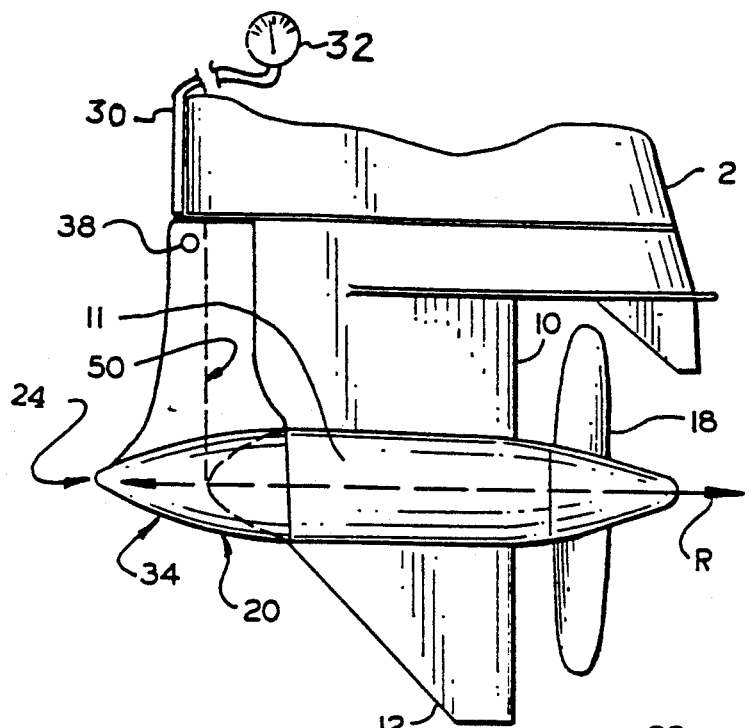
FIG. 3
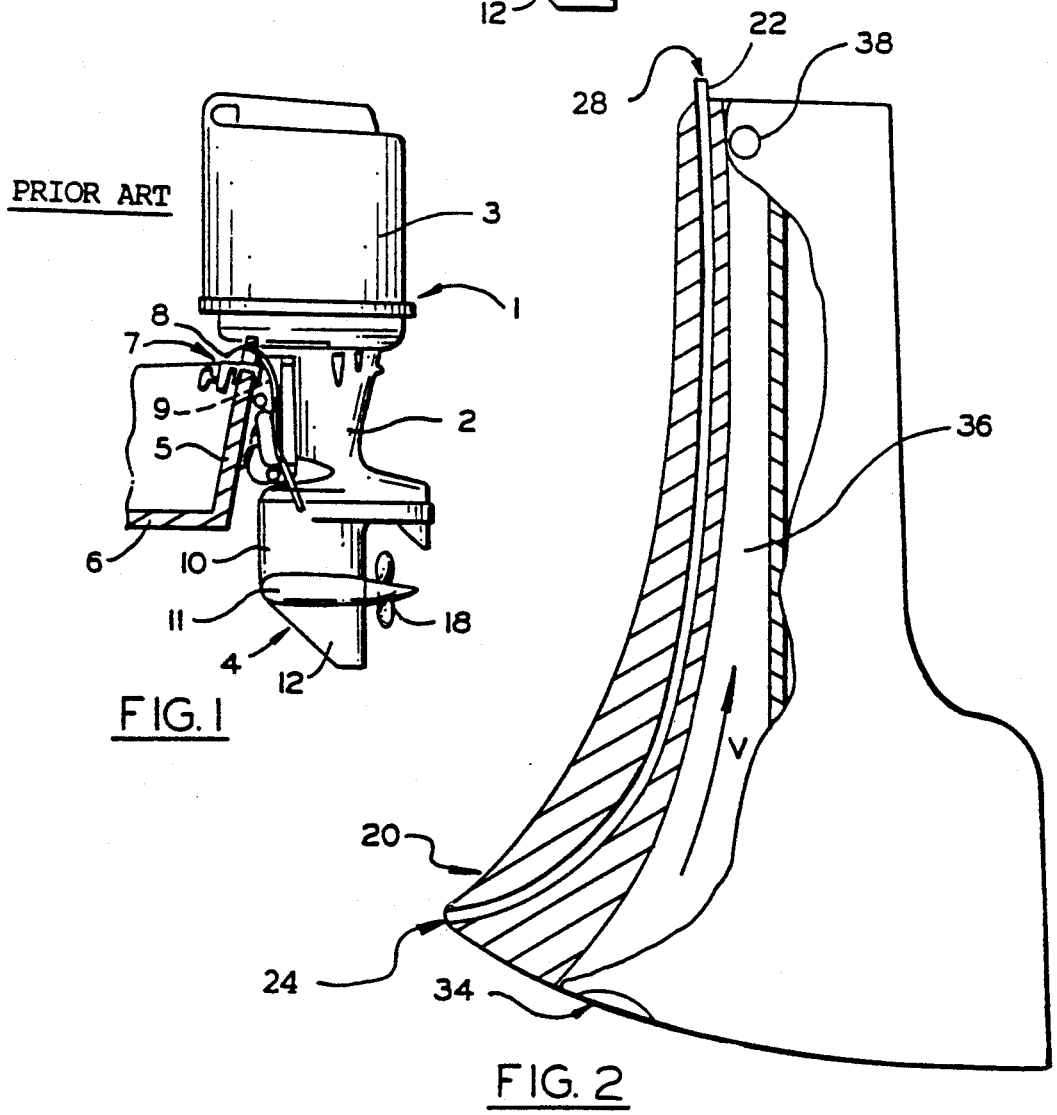
PRIOR ART
FIG. 1
FIG. 2

NOSE CONE WITH INTEGRAL SPEEDOMETER PICK-UP

The invention relates to a nose cone which is attachable to a propulsion device of a watercraft having means formed in the tip of the nose cone to accurately sense water pressure, as the watercraft travels through the water, and determining the speed of the watercraft.

BACKGROUND OF THE INVENTION

Speed indicating means sensitive to water pressure, which varies in accordance with the speed of the watercraft, have long been employed. The indicating means generally comprises a gauge, having units in knots or miles per hour, mounted on the watercraft at a position which is visible by the operator of the craft. The gauge is adapted to be actuated by the water pressure sensed by a pitot tube positioned in the water and having an orifice opening facing the direction of travel of the watercraft.

Sometimes the pitot tube for indicating the speed is mounted to the watercraft and extends beneath the hull. However, such an installation is generally inoperative and/or erratic when mounted on a hydroplaning boat which is frequently airborne for brief periods of time when travelling at high speeds. In addition, the pressure tube may also be incorporated integrally into the propulsion structure as can be seen in U.S. Pat. No. 2,627,181. However, with the orifice disposed above the gear case, as shown in that patent, the pressure tube is generally inoperative at high speeds as the gear case may be almost wholly out of the water with only lower end carrying the propeller engaging the water.

A second prior art reference, U.S. Pat. No. 3,210,995, teaches an arrangement in which the pitot tube is provided in the lower housing and comprises a generally horizontal fore-and-aft extending tubular passage disposed in the skeg adjacent to and spaced from the lower extremity of the motor. The tubular passage extends rearwardly from the leading edge of the skeg and provides an opening facing the forward direction of travel of the watercraft. Although this arrangement insures that the pressure tube is always in fluid communication with the water being traversed by the watercraft, the costs, labor and machining difficulties associated with manufacturing a tubular passage within the skeg of the motor make this arrangement a fairly expensive solution to the problem at hand. In addition, as the orifice opening is toward the rearward portion of the propulsion device, it can be influenced by the wake and other interference caused by the forward most portion of the propulsion device and this somewhat effects the accuracy and reliability of the sensed pressure.

The basic purpose of a nose cone is to streamline the gear case so as to increase the top speed and improve the handling of the watercraft. The nose cone may or may not be provided with cooling water inlet ports, located on the lower most portion of the casing, associated with an internal ducting in the nose cone and a water outlet provided above the water line. When present, this ensures that a steady source of cooling water is provided to the engine even when the engine is raised on the watercraft's transom to further increase the top speed and performance.

Wherefore, it is generally an object of the invention to provide a water pressure sensing arrangement which will sense the true instantaneous pressure and thereby accurately indicate the speed of the watercraft regardless of the position of the motor relative to the water surface.

It is a further object of the invention to provide a nose cone which is easily adaptable to the forward portion of outboard and outboard/inboard motors alike.

A still further object of the invention is to provide a water pressure sensor which can be easily cast or molded into a nose cone of a propulsion device and thereby reduce the cost and labor associated with machining a bore through various portions of a motor.

SUMMARY OF THE INVENTION

According to the invention there is provided in a nose cone assembly for attachment to a forward portion of a water propulsion device, said nose cone assembly comprising:

a substantially conical portion defining an axis along the length thereof and tapering to a tip which lies on said axis;

a streamlined vertical strut portion, extending substantially normal to said axis with a smooth transition between said conical portion and said vertical strut portion; and cavity means, remote from said tip, for attaching said nose cone assembly to a propulsion device;

the improvement wherein said nose cone assembly is provided with water pressure sensing means having an inlet located at the tip of the substantially conical portion facing along said axis and an outlet located in said vertical strut portion, remote from said tip, whereby when said nose cone assembly is attached to the forward portion of a propulsion device and subjected to water pressure as the propulsion device moves through water, said inlet of water pressure sensing means is subjected to essentially undisturbed water for detecting true instantaneous water pressure.

By casting a pitot tube with one end thereof located in the pointed tip of the nose cone all of the above noted drawbacks are overcome. Moreover, since the opening of the pitot tube is positioned in the tip of the nose cone, it is located at the forward most portion of the motor and is inherently in the highest pressure region. As such, it senses the true water pressure and is unaffected by wake or other disturbances which can be sensed if the pressure measurement is made toward the middle or rearward portion of the drive. The term "substantially conical portion", as used herein, is intended to cover conical portions having not only circular cross-sections, but also oval, elliptical, marquise and other similar cross-sections.

BRIEF DESCRIPTION OF THE DRAWING

The preferred embodiments of the invention will now be described, by way of example, with reference to the accompanying drawings, in which:

FIG. 1 is a side elevational view of an outboard motor secured to the stern portion of a watercraft;

FIG. 2 is a partial cross-sectional view of a nose cone, according to the present invention, having a water pressure opening located at the tip of the nose cone;

FIG. 3 is a side elevational view, similar to that of FIG. 1, showing the nose cone, according to the present invention, secured to the front portion of a motor.

Figure 4:
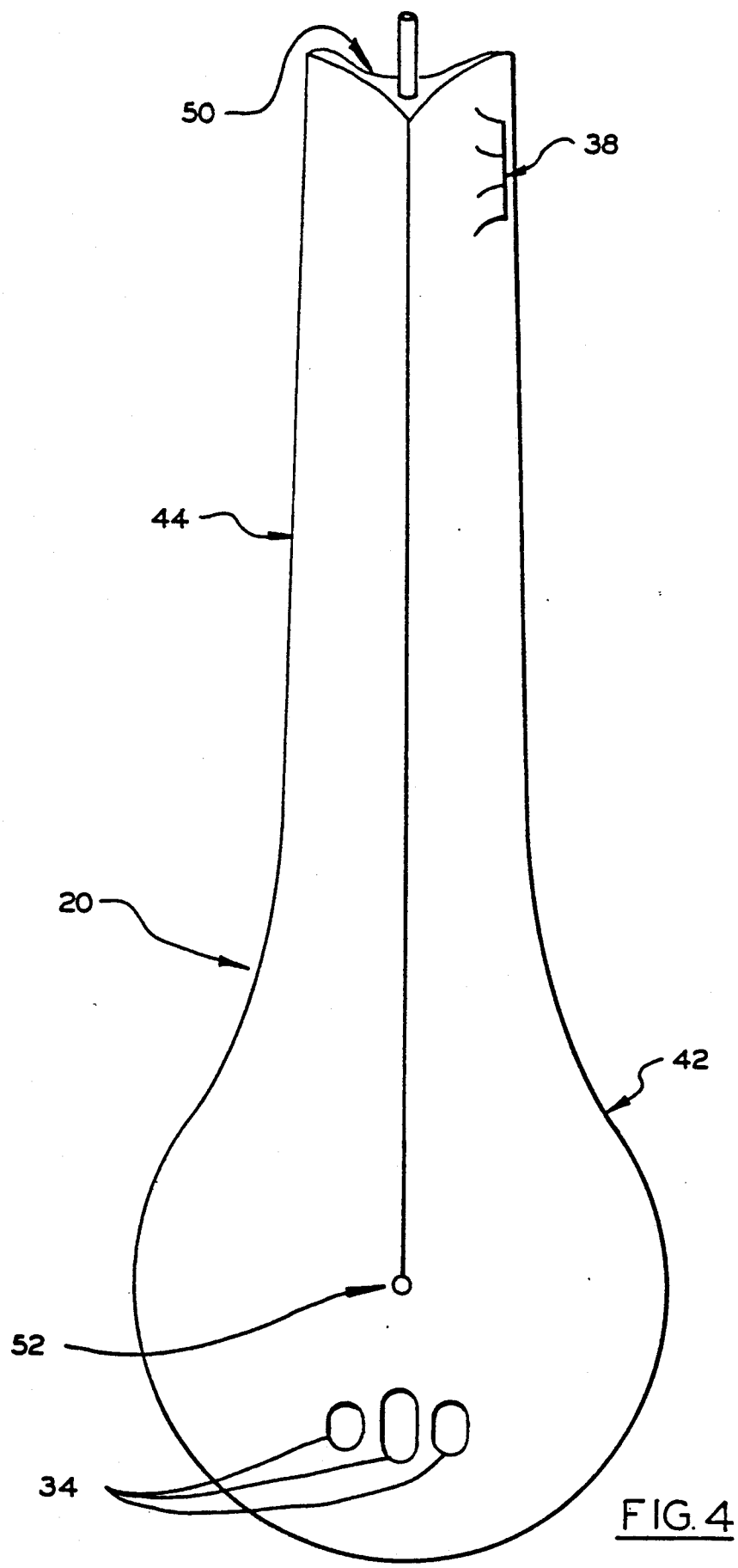
FIG. 4 is a diagrammatic representation of a front elevational view of the nose cone shown in FIG. 2.

Referring now to the FIG. 1, an outboard motor 1 can be seen having a drive shaft housing 2 supporting, at the upper end thereof, an engine (not shown) enclosed within a cowl 3 and, at the opposite end thereof, a lower housing 4. The motor 1 is removably secured to the transom 5 of the watercraft 6 by means of a bracket assembly 7 which provides for tilting movement of the motor unit in a generally vertical plane, on a generally horizontal tilt pin 8, and steering movement in a generally horizontal plane, on a generally vertical swivel pin 9.

The lower housing 4 includes vertical strut portion 10 adapted at its upper end for securement to the drive shaft housing 2, a gear case 11 beneath the strut portion, and a skeg 12 beneath the gear case. A drive shaft (not shown) extends downwardly within the housing and the strut portion 10 and drivingly connects the engine with a generally horizontal propeller shaft (not shown) rotatably disposed in gear case 11 via a pair of meshing bevel gears in the gear case chamber (not shown). The propeller shaft projects rearwardly through an opening in the gear case 11 and carries, rearwardly thereof, a propeller 18 for propelling the watercraft.

Turning now to FIG. 2, a novel arrangement of the water pressure pick up of the present invention will now be described in detail. The nose cone 20 is made of cast aluminum, or other castable material, and has a piece of tubing 22, with an inside diameter of about 3/32" and an outside diameter of about 5/32", cast within the aluminum casting upon forming the nose cone. The tubing is made from stainless steel, aluminum, or another material which is able to withstand corrosive environments. A first end 24 of the tubing 22 is positioned at and forms the tip of the nose cone 20 and lies on the axis of rotation R of the propeller 18. The tubing 22 extends horizontally rearward from the tip and gradually bends upward to the vertical so as to minimize any pressure losses which may occur within the tubing. The opposite end of the tubing 28 projects vertically out through the top edge of the nose cone 20 where it can be suitably connected, via flexible conduit means 30, with a calibrated gauge 32 which is positioned to be viewed by the operator of the watercraft, see FIG. 3.

When the watercraft is moving forward at a given speed, water is forced into the opening, in the tip of the nose cone 20, and the pressure generated is transmitted through tubing 22 and flexible conduit means 30 to pressurize the calibrated gauge 32 to indicate the instantaneous speed of travel.

If desired, water intake openings 34 can be provided in the lower intermediate portion of the nose cone 20. The intake openings 34 communicate with an exhaust opening 38, via passageway 36 in the nose cone 20. During forward travel of the watercraft, water enters the nose cone 20, through the intake opening 34, and flows vertically upward through the passageway 36 in the direction of arrow V, and is exhausted out through exhaust opening 38. A suitable connection from the engine is made to opening 38 to ensure that the motor 1 is provided with a continuous supply of cooling water even while the watercraft is operating at high speeds.

From the drawings, including FIG. 4, it can be seen that the nose cone comprises a substantially conical portion 42 which tapers to a tip 52, at the forward end thereof, and has a recess cavity 50 portion, extending along the entire rearward portion of the nose cone for accommodating the front gear case and vertical strut portion of a propulsion device, as can be seen in FIG. 2. The tip 52 of the nose cone is designed so that it lies substantially on the axis of rotation R of the propeller 18. The nose cone 20 additionally comprises a vertically extending streamlined strut portion 44 which extends substantially normal to the axis of rotation R. The conical portion 42 and the strut portion 44 are connected to one another in a manner such that their exterior surfaces having smooth transition from one portion to the other to streamline the hydrodynamic effect of the nose cone. The recessed cavity 50 is shaped to accommodate the vertical strut portion 10 and the gear case 11 of a propulsion device. The cavity 50 is defined by the exterior surfaces of the lower conical portion 42 and the strut portion 44. The nose cone is secured adhesively, or by other suitable means, to the gear casing and vertical strut portion of a motor or, alternatively, the propulsion device could be manufactured so that the vertical strut portion and gear case assembly substantially incorporate the profile of the nose cone of the present invention.

Within the scope of the present invention is an arrangement in which the pitot tube 22 extends rearwards from tip 52 to cavity 50 through passageway 36 and then extends vertically in the cavity 50, preferably in a groove in the foremost part of the cavity, to project upwardly for connection to conduit means 30. In such an arrangement, the pitot tube 22 may be adhered in place and suitably sealed to the nose cone.

Since certain changes may be made in the above nose/cone pitot tube arrangement without departing from the spirit and scope of the invention herein involved, it is intended that all matter contained in the above description and shown in the accompanying drawings shall not be construed as limiting the invention but shall be interpreted as illustrating the invention concept herein involved.

Wherefore, I claim:

1. In a nose cone assembly for attachment to a forward portion of a water propulsion device, said nose cone assembly comprising:

a substantially conical portion defining an axis along the length thereof and tapering to a tip which lies on said axis;

a streamlined vertical strut portion, extending substantially normal to said axis with a smooth transition between said conical portion and said vertical strut portion;

cavity means, remote from said tip, for attaching said nose cone assembly to a propulsion device;

the improvement wherein said nose cone assembly is provided with water pressure sensing means having an inlet located at the tip of the substantially conical portion facing along said axis and an outlet located in said vertical strut portion, remote from said tip, whereby when said nose cone assembly is attached to the forward portion of a propulsion device and subjected to water pressure as the propulsion device moves through water, said inlet of water pressure sensing means is subjected to essentially undisturbed water for detecting true instantaneous water pressure.

2. In a nose cone assembly according to claim 1, wherein said water pressure sensing means comprises a metal tube.

3. In a nose cone assembly according to claim 2, wherein said metal tube is manufactured from one of aluminum, stainless steel, brass and bronze.

4. In a nose cone assembly according to claim 2, wherein said metal tube has an outside diameter of about 3/32" and an outside diameter of about 5/32".

5. In a nose cone assembly according to claim 2, wherein said metal tube has a gradual transition between the inlet and the outlet to minimize any pressure loss which may occur within the metal tube.

6. In a nose cone assembly according to claim 2, wherein said metal tube is cast in said nose cone assembly during manufacture thereof.

7. In a nose cone assembly according to claim 6, wherein said nose cone assembly is cast from aluminum.

* * * * *